United States Patent
Foudazi et al.

(10) Patent No.: US 10,804,584 B1
(45) Date of Patent: Oct. 13, 2020

(54) MINIMIZE RADIO FREQUENCY CO-EXISTENCE IN PRODUCTS WITH LIGHT EMITTING DIODE DISPLAYS BY DIVERTING SURFACE CURRENT

(71) Applicant: Apple Inc., Cupertino, CA (US)

(72) Inventors: Ali Foudazi, San Jose, CA (US); Cheung-Wei Lam, San Jose, CA (US); Mahmoud N. Mahmoud, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/356,878

(22) Filed: Mar. 18, 2019

(51) Int. Cl.
| | | |
|---|---|---|
| *H04B 1/00* | (2006.01) | |
| *H01P 3/12* | (2006.01) | |
| *H01P 1/00* | (2006.01) | |
| *H05K 5/00* | (2006.01) | |

(52) U.S. Cl.
CPC .............. *H01P 3/12* (2013.01); *H01P 1/00* (2013.01); *H05K 5/0017* (2013.01)

(58) Field of Classification Search
CPC ............ H01P 3/12; H01P 1/00; H05K 5/0017
USPC ........................................................ 455/63.1
See application file for complete search history.

(56) References Cited

U.S. PATENT DOCUMENTS

| | | | |
|---|---|---|---|
| 6,972,727 B1 * | 12/2005 | West ................ | H01P 1/181 |
| | | | 333/157 |
| 7,732,829 B2 | 6/2010 | Murphy | |
| 8,717,243 B2 | 5/2014 | Yaccarino et al. | |
| 10,063,678 B2 | 8/2018 | Wong | |
| 10,200,092 B1 * | 2/2019 | Irci ............... | H04B 5/02 |
| 2014/0152518 A1 * | 6/2014 | Choudhury ........ | H01Q 5/357 |
| | | | 343/729 |
| 2017/0076658 A1 | 3/2017 | Yeo et al. | |
| 2017/0207028 A1 * | 7/2017 | Martinez ............ | H01G 4/12 |
| 2018/0342793 A1 * | 11/2018 | Lee ................. | H01Q 13/106 |
| 2018/0358686 A1 * | 12/2018 | Park ................ | H01Q 9/42 |
| 2019/0058244 A1 * | 2/2019 | Kim ................ | H01Q 13/103 |
| 2019/0190115 A1 * | 6/2019 | Samardzija ........ | H01Q 1/2291 |
| 2019/0386379 A1 * | 12/2019 | Kuo ................ | H01Q 5/335 |
| 2020/0026127 A1 * | 1/2020 | Lin ................. | G02F 1/133308 |

* cited by examiner

*Primary Examiner* — Kathy W Wang-Hurst
*Assistant Examiner* — Max Mathew
(74) *Attorney, Agent, or Firm* — Fletcher Yoder PC

(57) ABSTRACT

Systems, methods, and devices for diverting surface current on a display panel support plate are provided. An electronic transceiver device including a display panel may include a display back plate and a support plate, such that the support plate is disposed beneath the display back plate. The support plate may include an array of slots etched into the support plate, such that the array of slots may be used and positioned to divert an electromagnetic field on the support plate to redirect propagation of the surface current towards ground pins located on the display panel housing.

20 Claims, 7 Drawing Sheets

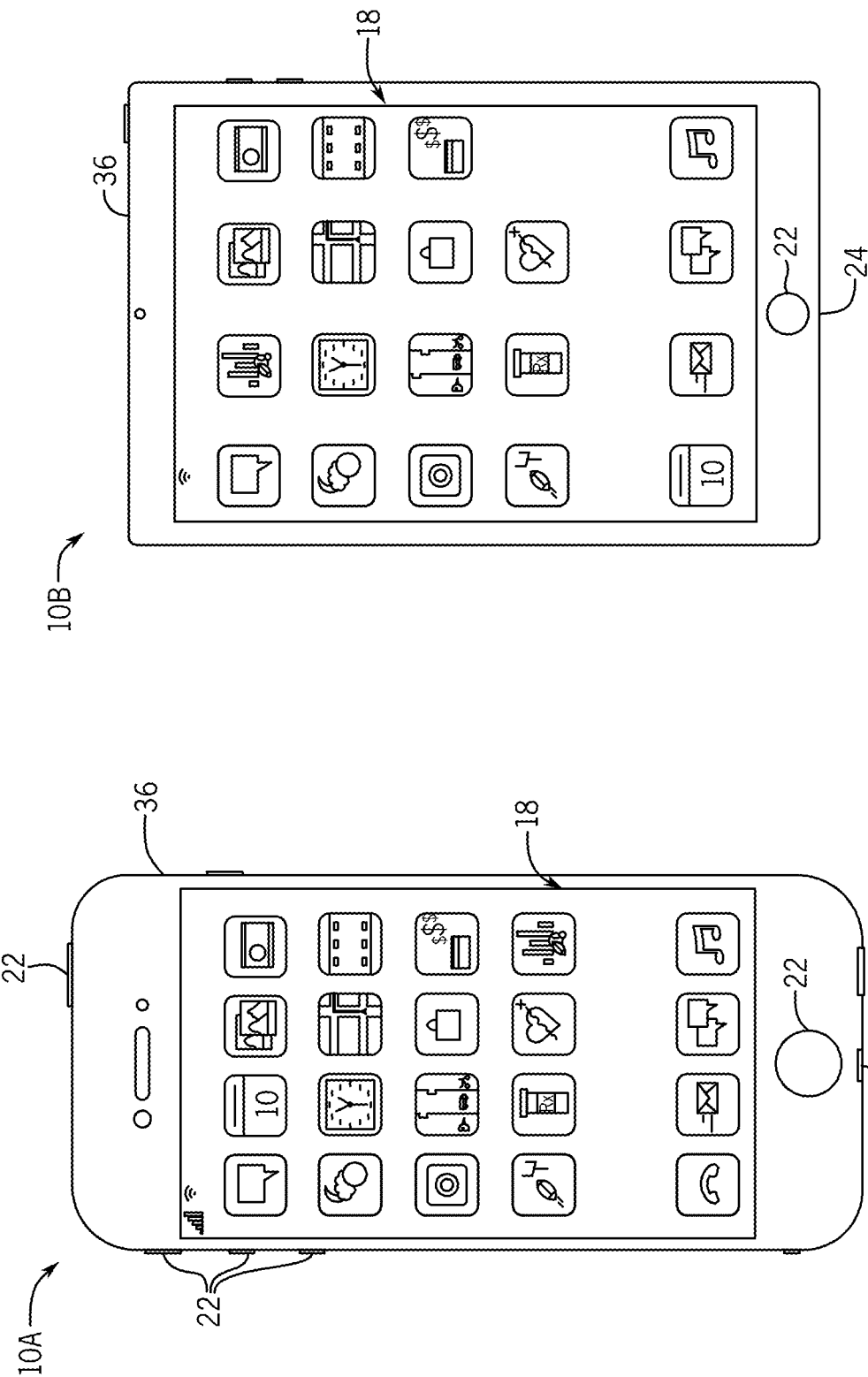

MINIMIZE RADIO FREQUENCY CO-EXISTENCE IN PRODUCTS WITH LIGHT EMITTING DIODE DISPLAYS BY DIVERTING SURFACE CURRENT

BACKGROUND

The present disclosure relates generally to wireless devices and, more particularly, to radio frequency (RF) devices that include a light emitting diode (LED) display with metallic back plate in parallel with single or multiple system metallic support plates.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as cellular phones and laptops, often include transceivers to facilitate wireless communication of data, such as by either transmitting or receiving wireless data signals, with other electronic devices. These data signals are typically communicated over a network channel on a frequency band to and from one or more wireless devices. By way of example, a laptop device may transmit data signals to another laptop device over a channel of a particular Wi-Fi frequency band (e.g., 2.4 GHz or 5 GHz).

In general, electronic devices include an electronic display to present visual information. One type of electronic display, a light emitting diode (LED) display, may include a display structure that allows unintended data signals (e.g., noise) to travel across the device. The noise may result in interference with the intended data signals. The noise may interfere with the data signals that are transmitted or received on a channel of the Wi-Fi frequency bands and potential loss of information encoded in the data signals due to the interference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to mitigating interference arising from integration of display module in the system, specifically from the orientation of a display plate relative to the system metallic support plate(s) in radio frequency (RF) devices. Generally, RF devices include a display, which may have an architecture of a glass substrate on top of one or more support plates in parallel. The parallel support plates may include a minimum spacing (e.g., air gap) between the plates for design purposes. However, the air gap may result in generating a transmission line effect. In some embodiments, surface current or noise from components within the RF device may travel to and adversely affect other components, such as those that may be used for wireless communication, such as an antenna for transmitting and receiving data signals. The surface current may flow across the support plate using the "transmission line" created by the parallel plate with an air/insulating gap in between. The noise current may result in interference with the receiving antenna, thereby causing overconsumption of power.

To facilitate wireless transmissions while mitigating noise, in some embodiments, an array of slots etched into a support plate may be used and positioned to divert the surface current towards ground pins located at the edges of the device housing. The slots may act as a pathway to change the direction of the surface current. For example, the slots may be used to divert the path of the surface current, thereby mitigating unwanted surface current flowing from one side of the device, such as the side with the noise-generating component, to the other side, such as the side with the antenna used for transmitting or receiving RF data signals.

In another embodiment, the length of the slots etched into the support plate may be tuned to divert the noise at particular frequencies. Short slot length may correspond to a high frequency band, while a long slot length may correspond to a low frequency band. A combination of slot lengths in the array of slots may allow tuning to a range of frequencies. By way of example, a device may communicate signals on a range of frequencies (e.g., 2.4 GHz and 5.0 GHz used for Wi-Fi), and thus, the length of the slots etched into the support plate of the device may be longer and vary in length in comparison to devices that may communicate data signals on a lower frequency band, such as 1.6 GHz used for global positioning system (GPS) communication.

In some embodiments, the number of slots and the spacing between the slots may vary based on the size of the support plate and/or device. The number of slots may be increased or decreased so long as the slots create a path to guide the surface current from the noise-generating component to towards the ground pins that would otherwise flow forward to components that may be adversely affected by the current. By way of example, fewer slots may be used to create path to divert surface current from the aggressor to the ground pins for a small display in comparison to large display.

Moreover, in other embodiments, the shape of the slots in the support plate may vary to tune to a range of frequencies. Multi-edged shapes, such as a bow-tie shaped slot, may be used to tune for a range of frequencies using the length of the multiple edges (e.g., bow edge length and bow height edge length).

Furthermore, in some embodiments, multiple arrays of slots may be etched or otherwise formed into the support plate when multiple noise sources exist that cause multiple surface currents to flow across the device. In this manner, wireless devices (e.g., RF devices) may mitigate interference of intended wireless signals transmitted and/or received while efficiently performing the wireless communications without overconsumption of power.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 2 is a front view of a handheld device representing an example of the electronic device of FIG. 1, in accordance with an embodiment;

FIG. 3 is a front view of a handheld tablet device representing another example of the electronic device of FIG. 1, in accordance with an embodiment;

DETAILED DESCRIPTION OF SPECIFIC EMBODIMENTS

Figure 1:
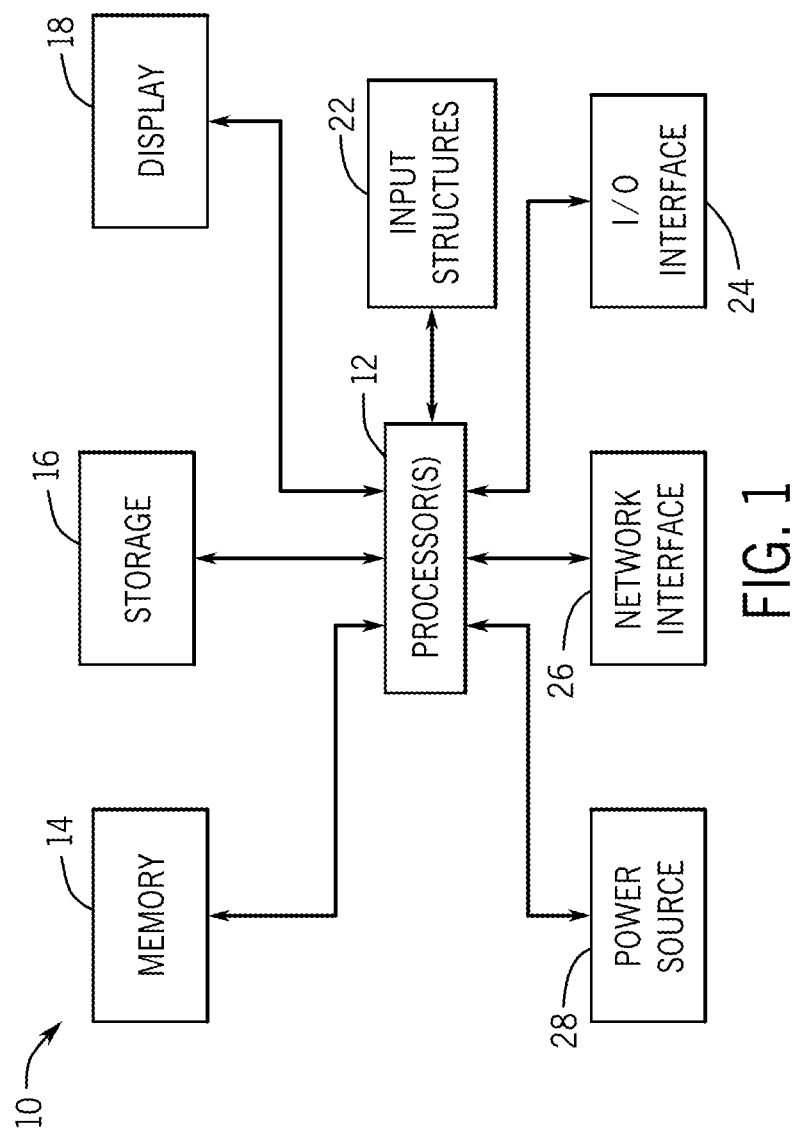
FIG. 1 is a block diagram of an electronic device with a display architecture that may include multiple display plates in parallel, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As previously mentioned, a radio frequency (RF) wireless device generally includes a display, such as a light emitting diode (LED) display, organic light emitting diode (OLED) display, and so forth, for visual presentation of information. Generally, an LED display is a display that uses an array of LEDs as pixels for a video display. The display architecture may include a glass substrate stacked on a metallic display plate that include material used to facilitate displaying images by the light emitted from the LEDs. Briefly, integrating the display module in the system, specifically from the orientation of a display plate relative to the system metallic support plate(s), as will be discussed in further detail herein, may generate a transmission line effect. The "transmission line" may carry noise by allowing surface current to flow from one side of the device from a noise generator, referred to herein as the "aggressor," to other side of the device to a component that may be adversely effected by the noise, referred to herein as the "victim." In particular, the aggressor may include components of the device that are used for device operations not directly associated with the intended wireless communication. For example, the aggressor may include diodes, microprocessor, chips, and the like. On the other hand, the victim may include device components that are impacted by the aggressor, such as components directly used for wireless communication operations. For example, the victim may include one or more antennas (e.g., Long-Term Evolution (LTE) antenna, global positioning system (GPS) antenna, and/or Wi-Fi antenna), low noise amplifier (LNA), power amplifier (PA), etc. Unintended signals, voltage, or surface current causing noise may travel from the aggressor to the victim via the transmission line created between the LED display and its support plate, thereby impacting the intended wireless communication signals.

To improve wireless signal communication between wireless devices, as discussed above, embodiments presented herein describe an array of slots formed in a support plate to divert the surface current to prevent it from adversely impacting certain device components, such as those used for wireless communication. Additionally, depending on the frequency band used for the wireless communication, the slots may be adjusted in length (e.g., shorter or longer) and shape (e.g., linear shape or bow-tie shape) in order to divert surface current at a particular frequency band or range of frequencies. For example, if surface current is flowing from the aggressor to the victim when the device is communicating using Wi-Fi, such that the surface current is interfering with wireless signals communicated on the 2.4 GHz and 5.0 GHz frequency bands, then the slots may be tuned to divert the surface current for a range of 2.4 GHz-5.0 GHz. Thus, if surface current is flowing from the aggressor to the victim but not interfering with wireless signals communicated on, for example, the 1.6 GHz frequency band, which is used for GPS communications, then the surface current may be continue flowing across the device to the victim since the slots have not been tuned for the 1.6 GHz band.

Moreover, the number of slots and the distance between them may be dependent on design specifications of the device. In particular, the number of slots and positioning of slots may be based on the location of the aggressor relative to the ground pins (e.g., which may be located towards the edge of the device) so as to create a path to turn the surface current towards the ground pins. Thus, the slots and positioning may be changed accordingly. In one embodiment, the ground pins are located towards the middle-edge of the device, and thus, the slots are positioned in a manner that diverts the surface current path towards the middle-edge of the device. Furthermore, multiple arrays of slots may be formed in the support plate in response to multiple aggressors causing noise that interferes with other components.

With the foregoing in mind, a general description of suitable electronic device that may utilize a display with an array of slots formed in its support plate will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a tangible computer-readable medium) or a combination of both hardware and software elements. It should be noted that FIG. 1 is merely one example of a particular implementation and is intended to illustrate the types of components that may be present in electronic device 10.

Figure 4:
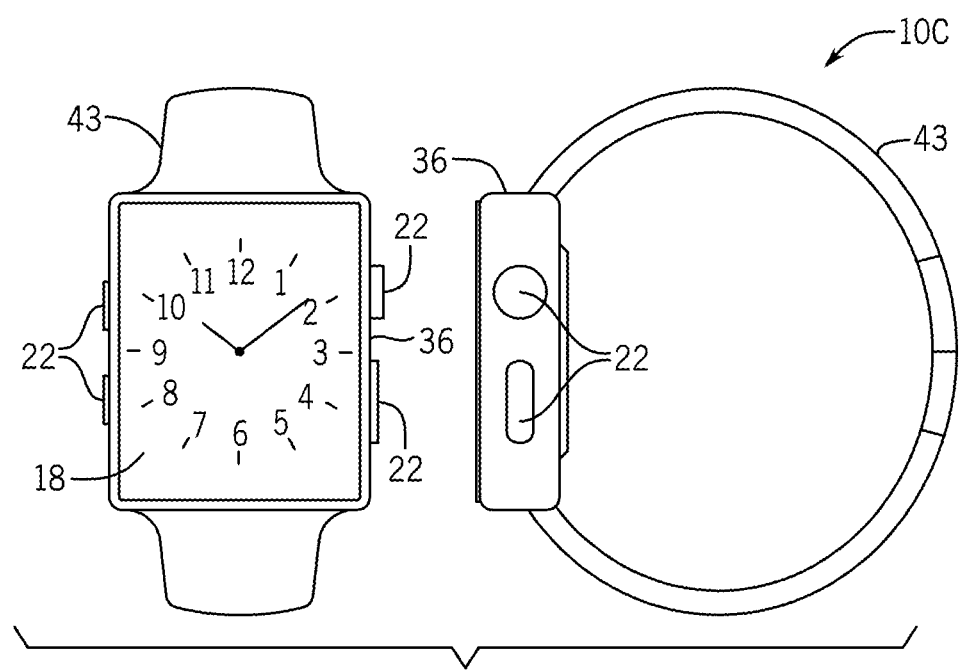
FIG. 4 is a front view and a side view of a wearable electronic device representing another example of the electronic device of FIG. 1, in accordance with an embodiment.

By way of example, the electronic device 10 may represent a block diagram of the handheld mobile device depicted in FIG. 2, the handheld tablet device depicted in FIG. 3, the wearable electronic device depicted in FIG. 4, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to facilitate the use of the processors (s) 12 to implement various stored algorithms. The algorithms may include algorithms to control one or more circuitry configurations (e.g., one or more antennas) to operate in different wireless communications, such as cellular, GPS, Wi-Fi, and the like. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, long term evolution license assisted access (LTE-LAA) cellular network. The network interface 26 may also include one or more interfaces for, for example, broadband fixed wireless access networks (WiMAX), mobile broadband Wireless networks (mobile WiMAX), and so forth.

As further illustrated, the electronic device 10 may include a power source 28. The power source 28 may include any suitable source of power, such as a rechargeable lithium polymer (Li-poly) battery and/or an alternating current (AC) power converter.

FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif. The handheld device 10A may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10A. For example, the input structures 22 may activate or deactivate the handheld device 10A, navigate user interface to a home screen, a user-configurable application screen, and/or activate a voice-recognition feature of the handheld device 10A. Other input structures 22 may provide volume control or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

In certain embodiments, the electronic device 10 may take the form of a portable tablet electronic device, a wearable electronic device, or other type of electronic device. Such devices may include computers that are generally portable (such as laptop, notebook, and tablet computers). In certain embodiments, the electronic device 10 in the form of a computer may be a model of a MacBook®, MacBook® Pro, or MacBook Air® from Apple Inc.

By way of example, FIG. 3 depicts a front view of a handheld tablet device 10B, which represents another embodiment of the electronic device 10. The handheld tablet device 10B may represent, for example, a tablet computer, or one of various portable computing devices. By way of example, the handheld tablet device 10B may be a tablet-sized embodiment of the electronic device 10, which may be, for example, a model of an iPad® available from Apple Inc. of Cupertino, Calif. The handheld tablet device 10B may also include an enclosure 36 that holds the electronic display 18. Input structures 22 may include, for example, a hardware or virtual home button. The I/O interfaces 24 may also open through the enclosure 36 and may include an I/O port for a hardwired connection for charging and/or content manipulation.

Similarly, FIG. 4 depicts a wearable electronic device 10C representing another embodiment of the electronic device 10 of FIG. 1 that may be using the techniques described herein. By way of example, the wearable electronic device 10C, which may include a wristband 43, may be an Apple Watch® by Apple Inc. More generally, the wearable electronic device 10C may be any wearable electronic device such as, for example, a wearable exercise monitoring device (e.g., pedometer, accelerometer, heart rate monitor), or other device by another manufacturer. The wearable electronic device 10C may also include an enclosure 36 that holds the electronic display 18. The display 18 of the wearable electronic device 10C may include a touch screen display 18 (e.g., light emitting diode (LED), organic light emitting diode (OLED) display, active-matrix organic light emitting diode (AMOLED) display, and so forth), as well as input structures 22, which may allow users to interact with a user interface of the wearable electronic device 10C.

In certain embodiments, as previously noted above, each embodiment (e.g., handheld device 10A, handheld tablet device 10B, and wearable electronic device 10C) of the electronic device 10 may wirelessly communicate with other devices. The display structure of the electronic devices 10 may include multiple layers or plates in parallel, such as a glass substrate on top of two or more display plates (e.g., display back plate and support plate). As previously discussed, the parallel display plates may create a transmission line affect that allows surface current to flow across the device 10, interfering with wireless signals, for example. Thus, the electronic devices 10 may benefit from a display that includes a support plate with an array of slots used to divert the surface current, thereby mitigating interference with wireless signals transmitted or received by the electronic device 10.

As described herein, in certain implementations, the array of slots may be positioned in a manner that diverts the path of the surface current towards the edge of the device 10 housing (e.g., enclosure 36), at which ground pins are located. In other implementations, the number of slots and the spacing between the slots of the array may be adjusted. For example, such that the number of slots and/or the spacing between the slots may increase or decrease based on guiding the surface current to change its present forward flowing path to a path towards the ground pins on the device 10 (e.g., the middle edge of device 10 housing). By way of example, the display 18 of the handheld tablet device 10B may be larger than the display 18 of the wearable electronic device 10C. Accordingly, the handheld tablet device 10B may utilize a greater number of slots (e.g., 10 slots) in its support plate to sufficiently guide the surface current towards the middle edge of the handheld tablet device 10B, whereas fewer slots (e.g., 2 slots) may be used for the smaller display 18 of the wearable electronic device 10C since a smaller distance may exist between the aggressor component to the middle edge of the device 10C. In other implementations, the length and/or shape of the slots may be adjusted to tune to a particular frequency band or range of frequency bands, such that surface current is diverted at the intended frequency band or range of frequency bands.

Figure 5:
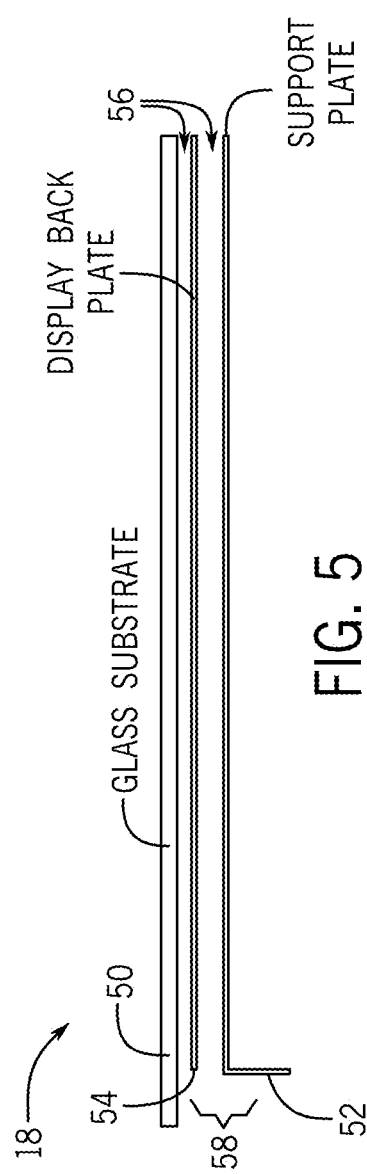
FIG. 5 is a side view of the multiple display plates in parallel of the electronic device of FIG. 1, in accordance with an embodiment.

To further illustrate the orientation of display plates, FIG. 5 depicts the structural architecture of display 18 of FIGS. 1-4, illustrating the different layers of the display. In some embodiments, the display 18 may include multiple layers of material or plates, such as a glass substrate 50 (e.g., cover glass) orientated on top of a display back plate 54, which is further oriented on top of a support plate 52. The display back plate 54 may include conductive material (e.g., metal), such that the display back plate 54 behaves as a conductive plate. Similarly, support plate 52 beneath the display back plate 54 may also include conductive material, such that the support plate 52 behaves as a conductive plate. The conductive plates in parallel may form a capacitor, such that when voltage is applied to the plates, an electrical current may charge one of the conductive plates (e.g., display back plate 54) with a positive charge with respect to the supplied voltage and charge the other conductive plate (e.g., support plate 52) with a negative charge with respect to the supplied voltage. Thus, an electric field may exist between the conductive plates.

The various layers of the display 18, such as the conductive display back plate 54 and support plate 52, may be separated by a dielectric material to reduce the electric field and increase capacitance. The dielectric layer 56 may include non-conducting insulating material that includes, but is not limited to, plastic, ceramic, glass, and/or air. As depicted, and additionally or alternatively to the dielectric layer 56, the layers may be separated by an air gap 58. The size of the air gap 58 (e.g., more than 0 mm) may be predetermined based on design specification, such that the air gap 58 may provide the display 18 flexibility with a less rigid design structure.

However, the air gap 58 between the display back plate 54 and support plate 52 may create a transmission line affect that may allow surface current to travel across the support plate 52, resulting in interference with other components, such as a wireless transceiver and the wireless signals communicated by the device 10.

Figure 6:
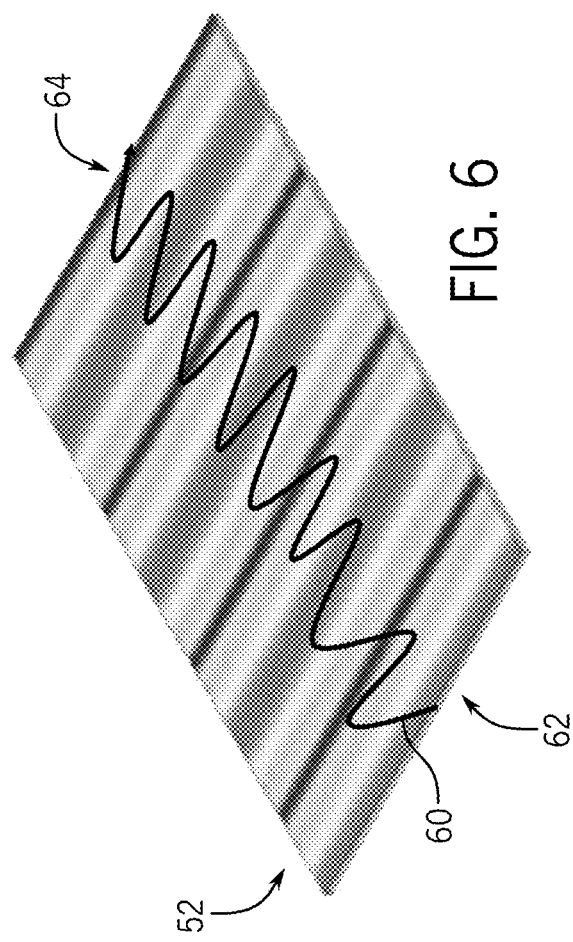
FIG. 6 is a perspective view of surface current traveling across a support plate of the display by a transmission line effect created between the parallel display plates of FIG. 5, in accordance with an embodiment.

To illustrate, FIG. 6 depicts surface current flowing across the support plate 52 of FIG. 5. As shown, the surface current 60 flows from the "aggressor" 62 to the "victim" 64. As previous discussed, the aggressor 62 may include device components that create noise that may impact the performance of other device components used for intended device operations, such as wireless communications. By way of example, the aggressor 62 component may include, but is not limited to, diodes, chips, microprocessors, and the like. The aggressor 62 components may result in surface current 60 flowing from it to other components of the device, the victim 64, such as those used for the intended wireless signals. By way of example, the victim 64 component may include one or more device antennas (e.g., Long-Term Evolution (LTE) antenna, GPS antenna, and/or Wi-Fi antenna), low noise amplifier (LNA), power amplifier (PA), etc. The surface current 60 may flow from the aggressor 62 to the victim 64 via the support plate 52, thereby impacting the intended wireless communication signals, which may further result in the device 10 consuming additional power to transmit and/or receive the wireless signals impacted.

Figure 7A:
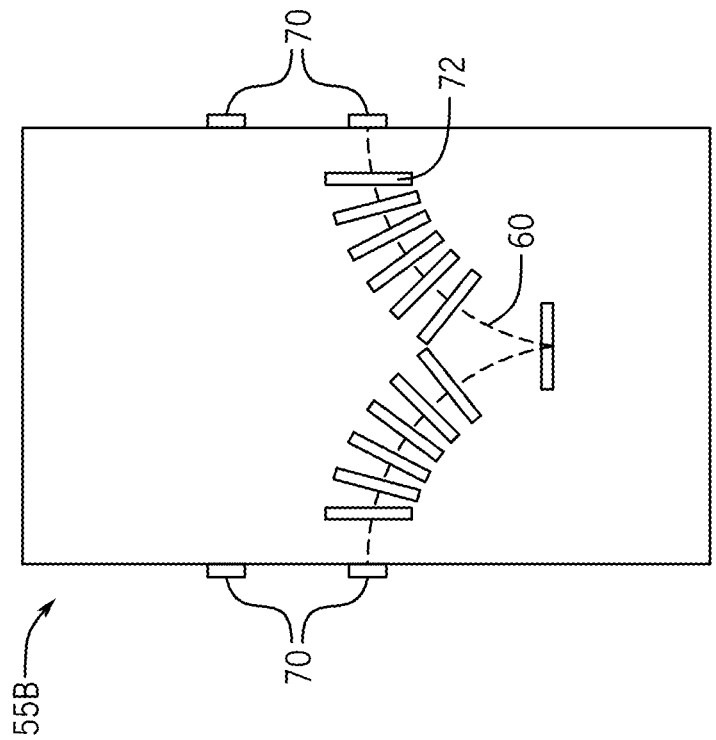
FIG. 7A is a diagram of an array of slots formed in a modified support plate of FIG. 6, used to divert current to ground pins, in accordance with an embodiment.

To mitigate the noise caused by the surface current 60, diagram in FIG. 7A depicts a modified support plate 55A with an array of slots 72 used to divert the electromagnetic field on the modified support plate 55A, thereby redirecting propagation of the surface current 60. The array of slots 72 may extend through the plate and may be formed in any suitable way, and positioned in a manner that guides the surface current 60 onto a particular path defined by the array of slots 72. The surface current 60 may originate from an aggressor 62 component and may flow across the device towards a victim 64 component (e.g., antenna). As the surface current 60 flows from the aggressor 62 to the victim 64, the slots 72 may divert or turn the surface current 60 flow path so that it does not reach certain components that may be adversely affected.

The path may guide the surface current 60 away from the victim 64 and towards the device 10 housing, which may be used to short the surface current 60. In the depicted embodiment, ground pins 70 of the device 10 housing are used for grounding certain components, and thus, the slots 72 may be positioned to guide the surface current 60 towards the closest ground pins 70. As shown, the closest ground pins 70 are located at middle edges (e.g., left middle edge of the device 10 and the right middle edge of the device 10). Accordingly, the array of slots 72 may divert the surface current 60 originating from the aggressor 62 to the middle edges of the device 10, thereby preventing (or at least reducing) the surface current 60 from flowing to one or more victim 64 components on the modified support plate 55A.

Figure 7B:
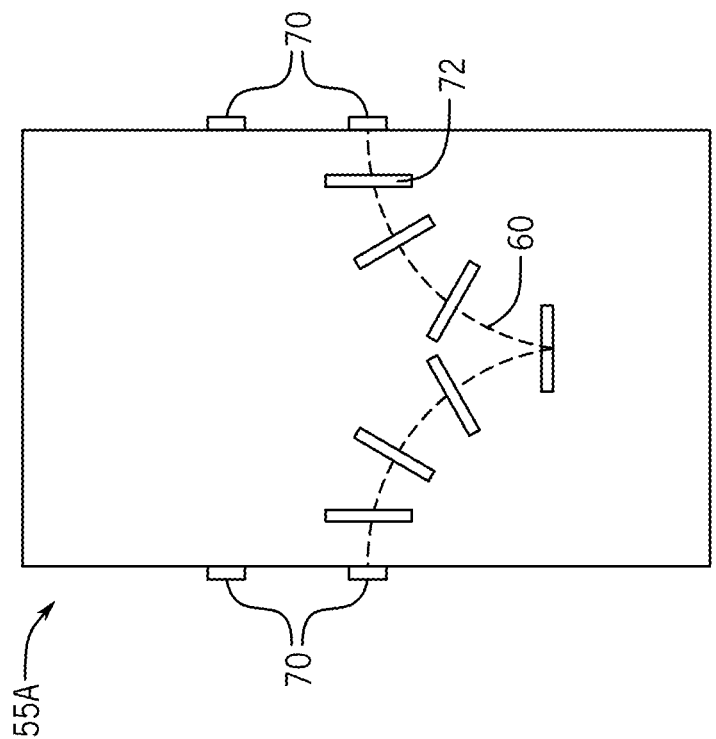
FIG. 7B is a diagram of an array of additional slots formed in a modified support plate of FIG. 6, used to divert current to ground pins, in accordance with an embodiment.

To further detail the slots 72 used to divert the surface current 60, diagram of FIG. 7B illustrates the modified support plate 55B with a particular number of slots 72. In general, the total number of slots 72 and/or spacing between the slots 72 may be dependent on creating a suitable path to properly divert the surface current 60 towards the ground pins 70. Thus, the number of slots 72 used to create the path to the ground pin 70 may be based on the location of the aggressor 62 components, location of the victim 64 components, location of ground pins 70, and/or size of the modified support plate 55B. The number of slots 72 may be at a minimum number of two, such that the first slot 72 is used to divert the surface current 60 away from the victim 64 and the second slot is used to further divert the surface current to the ground pin 70.

Moreover, the orientation of the slots 72 may be positioned (e.g., orientation and spacing) such that the path guides the surface current 60 by turning it towards the ground pins 70. By way of example, the slots 72 may be oriented at various degrees to provide proper turning of the surface current 60, such as 0°, 30°, 60°, 90° (e.g., depicted slots on support plate 55A of FIG. 7A). However, slot 72 orientation and spacing may be adjusted as the number of slots increases/decreases. As the number of slots 72 on the modified support plate 55B increases along the path, the orientation of the slots 72 may be progressively angled to continue turning the surface current 60 towards the ground pins 70.

The size of the modified support plate 55 may be approximately the same size as other plates 52, 54 and glass substrate 50 that are part of the display 18 structure, and thus, approximately the same size as device 10. By way of example, the display 18 of handheld tablet device 10B may be larger than the display 18 of wearable electronic device 10C, and thus, their respective support plates 52 may be larger and smaller. As shown, the modified support plate 55B may include thirteen slots, which may represent a large modified support plate 55B of handheld tablet device 10B, for example, to create a pathway sufficient for the surface current 60 to follow towards the ground pins 70. Moreover, if the ground pins 70 were located closer to the aggressor 62 component, such as may occur on a smaller modified support plate 55 of wearable electronic device 10C, then fewer slots 72 may be utilized, and vice versa.

Figure 7D:
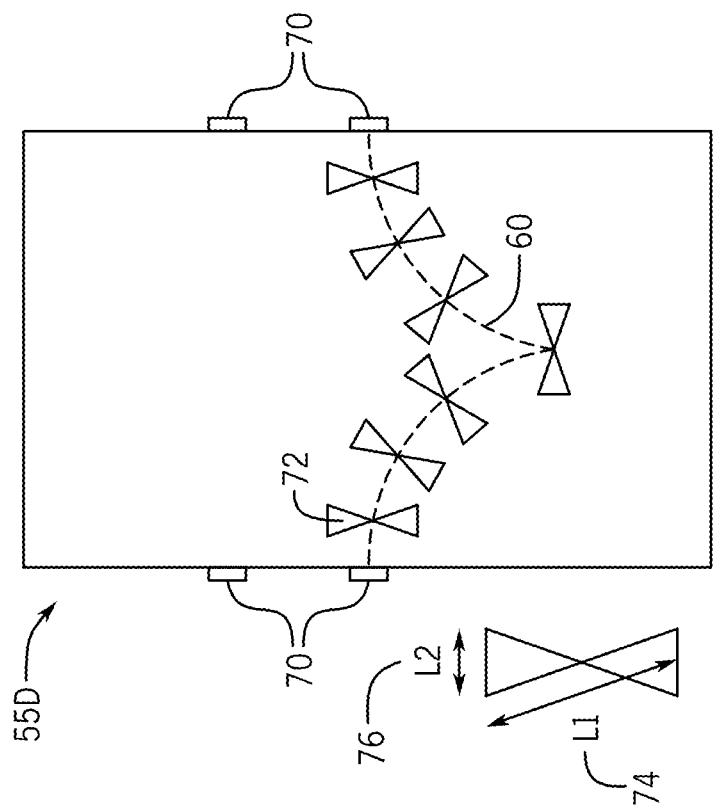
FIG. 7D is a diagram of an array of bow-tie shaped slots formed in a modified support plate of FIG. 6, used to divert current to ground pins, in accordance with an embodiment.
Figure 7C:
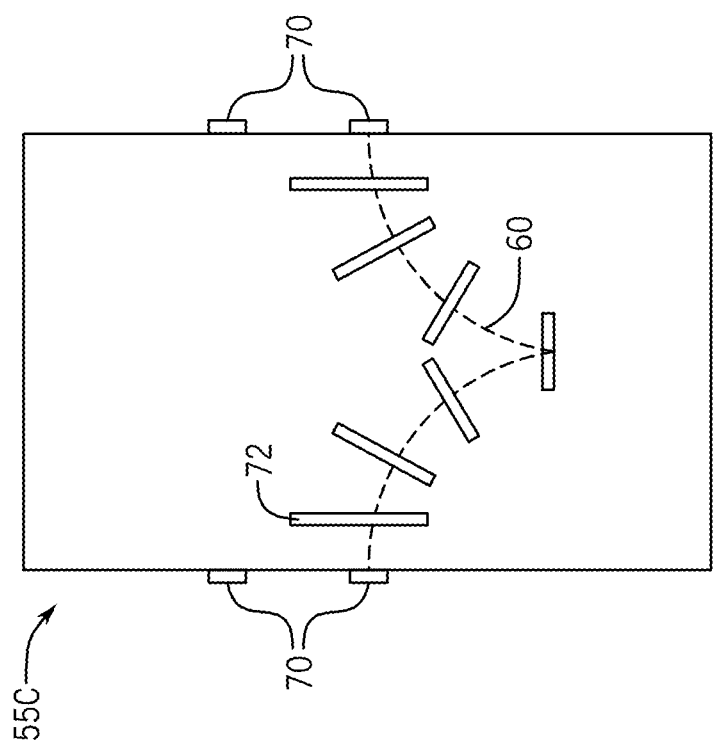
FIG. 7C is a diagram of an array of slots of varying length formed in a modified support plate of FIG. 6, used to divert current to ground pins, in accordance with an embodiment.

In other embodiments, the length of the slots 72 may be varied to tune to a particular frequency. To illustrate the varying length of the slots 72, the diagram of FIG. 7C depicts the modified support plate 55C with slots 72 of various different lengths. The length of the slots 72 may be tuned to a particular frequency band or range of frequency bands. Thus, the surface current 60 flowing from the aggressor 62 to the victim 64 is diverted for the particular frequency band or range of frequency bands while surface current 60 occurring on other frequency bands may continue to flow. Short slots 72 (e.g., approximately 25 mm) may correspond to high frequency bands (e.g., 5.0 GHz) and short wavelengths, while longer slots (e.g., approximately 50 mm) may correspond to low frequency bands (e.g., 2.4 GHz) and longer wavelengths. By way of example, the device 10 may be a cellular device, such as handheld mobile device 10A depicted in FIG. 2, and may communicate cellular signals on the 700 MHz and 800 MHz bands. Thus, mitigating surface current 60 or noise occurring on other frequency bands outside of harmonic frequencies of the transmitting signal may not be of interest. Accordingly, the array of slots 72 etched into the modified support plate 55 of handheld mobile device 10A may include long slots 72. Moreover, since diverting surface current 60 on more than one frequency band, such as both 700 MHz and 800 MHz, may be beneficial when communicating cellular signals, the length of the slots 72 on the modified support plate 55C may be varied.

Additionally or alternatively, the shape of the slots 72 may be tuned to a range of frequencies. As illustrated in diagram of FIG. 7D, modified support plate 55D may include an array of bow-tie shaped slots 72, such that the edges of the bow-tie shape may vary in length and correspond to different frequencies. For example, a bow-tie shaped slot 72 may have two or more different lengths, and thus, tuned to divert surface current 60 within the range of the two different frequencies. As shown, the bow-tie shaped slot 72 includes a narrow center (e.g., tie of the bow-tie) that steadily increases in width towards the edge (e.g., bow ends of the bow-tie), such that the bow-tie shape includes at least two different lengths for tuning. In particular, the bow-tie shaped slot 72 may be tuned for a low frequency by the long length edge 74, L1, of the bow-tie shaped slot 72, up to a high frequency by the short length 76, L2. In this manner, the lengths of the bow-tie shaped slot 72 may be used for tuning to a range of frequencies rather than a particular frequency band, at which the surface current 60 may be diverted.

Figure 8:
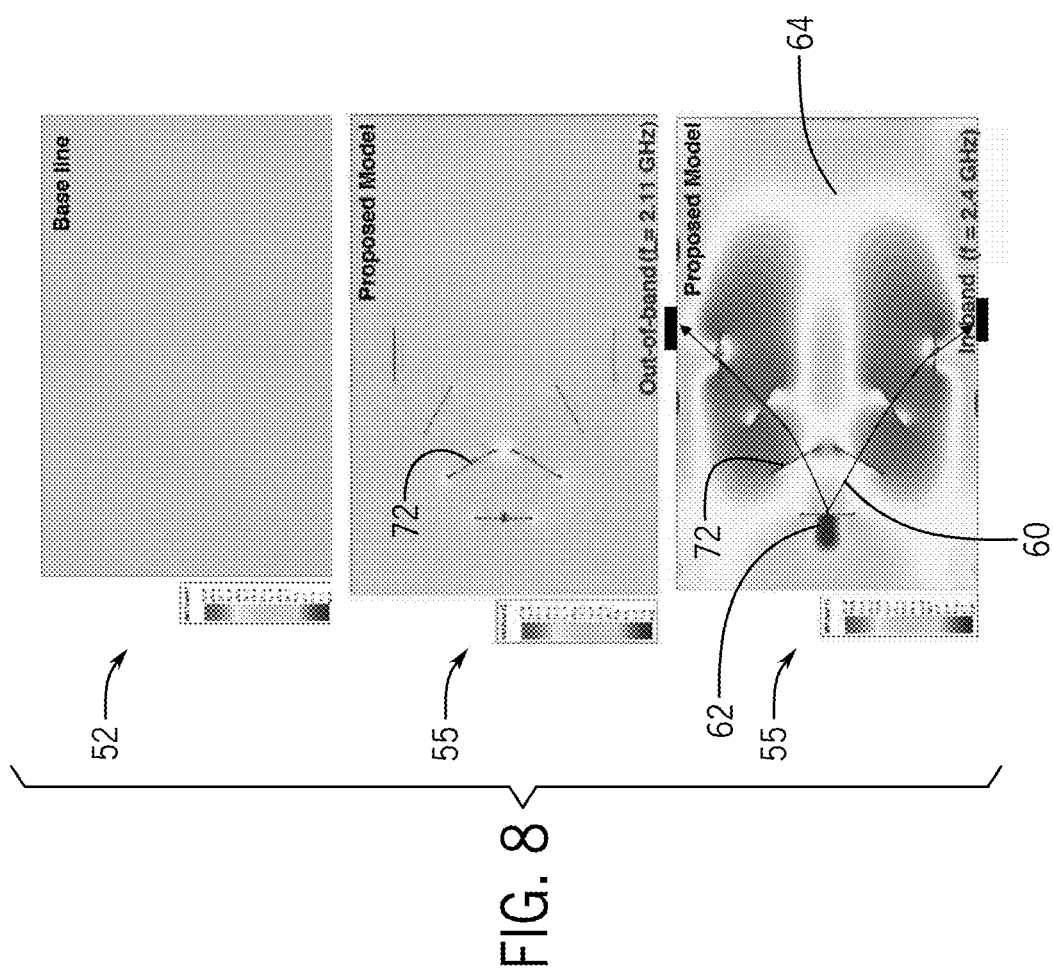
FIG. 8 is a diagram of surface current flow on the modified support plate with a tuned array of slots of FIG. 7, in accordance with an embodiment.

To illustrate the impact of the slots 72 on surface current 60, diagrams of FIG. 8 illustrate the flow of surface current 60 occurring in-band and out-of-band frequencies. Specifically, support plate 52 illustrates the concentration of surface current 60 as generally uniform across the support plate 52. However, modified support plate 55 illustrates an array of slots 72 formed in the modified support plate 55 (e.g., 55A, 55B, 55C, 55D) to divert surface current 60 by concentrating the surface current 60 on the slots 72. Since the slots 72 are uniform in length and shape, the slots 72 may be tuned, for example, for the particular frequency band of 2.4 GHz. As illustrated, the surface current 60 may remain mostly uniform on the modified support plate 55 when the surface current 60 occurs at an out-of-band frequency, for example, at 2.11 GHz. However, if the surface current 60 flows from the aggressor to the victim at 2.4 GHz, and thus, occurs in-band, the surface current 60 may be diverted by the slots 72 tuned for 2.4 GHz.

In particular, the slots 72 cause the surface current 60 to wrap around or concentrate on to the slots 72, thereby redirecting the surface current 60 propagation onto the path created by the slots 72 towards the ground pins 70. Thus, the highest concentration of the surface current 60 may be closest to the slots 72 while the surface current 60 may be the lowest when furthest away from the slots, such as near the aggressor 62 and victim 64.

Figure 9:
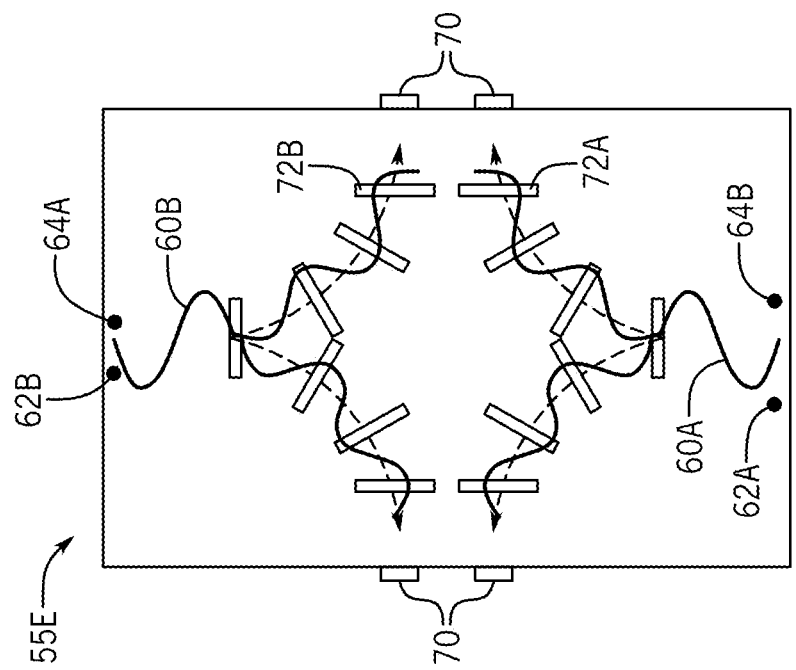
FIG. 9 is a diagram of multiple arrays of slots formed in the modified support plate, in accordance with an embodiment.

In some instances, the device 10 may include multiple aggressors 62 that may cause surface current 60 to flow across the display 18. Accordingly, multiple arrays of slots 72 may be used to divert the multiple surface current 60 flows. Block diagram of FIG. 9 illustrates a modified support plate 55E with multiple aggressors 62 and victims 64, such that surface current 60 may flow from the bottom of the modified support plate 55E to the top of the modified support plate 55E, and vice versa. By way of example, an aggressor 62 may cause surface current 60 to flow and impact signals transmitted from a victim 64 (e.g., antenna used for cellular signals) while another aggressor 62 may cause surface current 60 that impacts signals transmitted from a different victim 64 (e.g., antenna used for Wi-Fi). Moreover, the multiple aggressors 62 may allow surface current 60 to flow and impact intended wireless signals on different frequency bands.

As depicted, an array of slots 72 may be used to divert surface current 61 and 63 caused by the multiple aggressors 62A, 62B. As shown, a first array of slots 72A may be used to divert surface current 60A that may otherwise flow from a first aggressor 62A to towards the top of the modified support plate 55E to a first victim 64A, by diverting surface current 60A to the ground pins 70. Similarly, a second array of slots 72B may be used to divert the surface current 60B that may otherwise flow from a second aggressor 62B to towards the bottom of the modified support plate 55E to a second victim 64B, by diverting the surface current 60B to the ground pins 70. Although not explicitly shown, the array of slots 72A, 72B may be adjusted (e.g., increase or decrease length and/or adjust shape) to tune to a particular frequency band or range of frequency bands using the techniques described herein.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An electronic transceiver device comprising a display panel, comprising:
   a display back plate; and
   a support plate disposed substantially coincident with and substantially parallel to the display back plate, wherein the support plate comprises an array of slots formed in the support plate, and wherein the array of slots is configured to divert a surface current on the support plate.

2. The electronic transceiver device of claim 1, wherein the display back plate or the support plate, or a combination thereof, are conductive plates.

3. The electronic transceiver device of claim 2, wherein the display panel comprises an air gap between the display back plate and the support plate, and wherein the air gap creates a transmission line effect that allows the surface current to flow across the support plate.

4. The electronic transceiver device of claim 3, wherein the array of slots is positioned to guide the surface current towards one or more ground pins on the support plate.

5. The electronic transceiver device of claim 4, wherein a length of a slot of the array of slots is selected to allow tuning to a particular frequency band or range of frequencies, wherein the tuning allows diversion of the surface current occurring on the tuned frequency band or range of frequencies.

6. The electronic transceiver device of claim 5, wherein the array of slots is configured to allow the surface current to continue to flow across the support plate in response to wireless signals communicated on a different frequency band, wherein the different frequency band is different than the tuned frequency band or range of frequencies.

7. The electronic transceiver device of claim 5, wherein the array of slots comprises two or more slots.

8. The electronic transceiver device of claim 7, wherein the two or more slots are of different lengths.

9. The electronic transceiver device of claim 7, wherein the length of a first slot of the two or more slots corresponds to tuning to a first frequency band and the length of a second slot of the two or more slots corresponds to tuning to a second frequency band, and wherein the first frequency band and the second frequency band are different.

10. The electronic transceiver device of claim 7, wherein a first slot of the two or more slots is positioned proximate a first component of the device, wherein a second slot of the two or more slots is positioned proximate to one or more ground pins, wherein the surface current flows from the first component of the device to the one or more ground pins.

11. The electronic transceiver device of claim 1, wherein the display panel comprises a light emitting diode (LED) panel.

12. A support plate of a display panel of an electronic transceiver device, comprising:
    a first array of two or more slots formed in the support plate, wherein the first array of two or more slots is configured to divert surface current that flows across the support plate from a first component toward a second component, wherein the display panel comprises a display back plate, wherein the support plate is disposed substantially coincident with and substantially parallel to the display back plate.

13. The support plate of claim 12, wherein the first array of two or more slots is configured to concentrate the surface current onto the slots.

14. The support plate of claim 12, wherein the first array of two or more slots is positioned to divert the surface current towards one or more ground pins on the support plate.

15. The support plate of claim 12, wherein the display back plate or the support plate, or a combination thereof, are conductive plates.

16. A display panel of an electronic transceiver device, comprising:
    a light emitting diode (LED) display back plate; and
    a support plate disposed adjacent and substantially parallel to the LED display back plate, wherein the support plate comprises an array of slots formed in the support plate, and wherein the array of slots is configured to divert a flow of a surface current on the support plate, wherein the support plate is disposed substantially parallel to the LED display back plate.

17. The display panel of claim 16, wherein each of the array of slots comprise a first length and a second length, wherein the first length is tuned to a first frequency band, wherein the second length is tuned to a second frequency band.

18. The display panel of claim 16, wherein the first length is shorter than the second length, and wherein the first length corresponds to higher frequency band than the second length.

19. The display panel of claim 16, wherein the array of slots is positioned to divert the surface current towards one or more ground pins on the support plate.

20. The display panel of claim 16, wherein the LED display back plate or the support plate, or a combination thereof, are conductive plates.

* * * * *